(12) United States Patent
Guo et al.

(10) Patent No.: US 12,111,155 B2
(45) Date of Patent: Oct. 8, 2024

(54) SYSTEMS AND METHODS FOR MEASURING WATER CAPACITY OF POLAR LAKES

(71) Applicant: Polar Research Institute of China, Shanghai (CN)

(72) Inventors: Jingxue Guo, Shanghai (CN); Yuchen Wang, Shanghai (CN); Yang Sun, Shanghai (CN)

(73) Assignee: Polar Research Institute of China, Shanghai (CN)

( * ) Notice: Subject to any disclaimer, the term of this patent is extended or adjusted under 35 U.S.C. 154(b) by 300 days.

(21) Appl. No.: 17/891,598

(22) Filed: Aug. 19, 2022

(65) Prior Publication Data
US 2023/0400302 A1  Dec. 14, 2023

(30) Foreign Application Priority Data
Jun. 13, 2022 (CN) .......................... 202210659942.5

(51) Int. Cl.
| | | |
|---|---|---|
| G01C 13/00 | (2006.01) | |
| G01C 11/02 | (2006.01) | |
| G06T 7/62 | (2017.01) | |

(52) U.S. Cl.
CPC ............ *G01C 13/008* (2013.01); *G01C 11/02* (2013.01); *G06T 7/62* (2017.01); *G06T 2207/10028* (2013.01); *G06T 2207/10032* (2013.01)

(58) Field of Classification Search
CPC ...... G01C 13/008; G01C 11/02; G01C 13/00; G06T 7/62; G06T 2207/10028;
(Continued)

(56) References Cited

FOREIGN PATENT DOCUMENTS

| CN | 106323244 A | * | 1/2017 |
| CN | 109911188 A | * | 6/2019 |

(Continued)

OTHER PUBLICATIONS

CN-106323244-A (Year: 2017).*
(Continued)

*Primary Examiner* — Kristina M Deherrera
*Assistant Examiner* — Fatemeh Esfandiari Nia
(74) *Attorney, Agent, or Firm* — Jeffrey L. Wendt; The Wendt Firm, P.C.

(57) ABSTRACT

The present disclosure provides a system and a method for measuring water capacity of polar lakes, and relates to the technical field of lake water capacity measurement. The method comprises the steps: controlling an unmanned aerial vehicle to move along with an unmanned underwater vehicle at a preset height right above the unmanned underwater vehicle by utilizing an ADRC algorithm; obtaining lake surface point cloud data, under-lake point cloud data and under-lake single-beam ranging data so as to construct a water three-dimensional topographic map, a lake coastal three-dimensional topographic map and a lake bottom three-dimensional topographic map under the same coordinate system, and then determining the lake water capacity. By arranging the unmanned underwater vehicle, an unmanned underwater vehicle-mounted module, the unmanned aerial vehicle and an unmanned aerial vehicle-mounted module, lake elevation and lake underwater terrain data are automatically measured, so that the observation precision of polar lakes is improved.

14 Claims, 8 Drawing Sheets

(58) Field of Classification Search
CPC ........... G06T 2207/10032; Y02A 90/30; G01S 15/86; G01S 15/88; G01S 15/89; G01S 17/88; G01S 17/86; G01F 17/00; G01F 22/00
See application file for complete search history.

(56) References Cited

FOREIGN PATENT DOCUMENTS

| | | | | | |
|---|---|---|---|---|---|
| CN | 112947477 | A | * | 6/2021 | |
| CN | 113256702 | A | * | 8/2021 | ............... G06T 7/13 |
| CN | 113804165 | A | * | 12/2021 | ............. G01C 11/04 |
| CN | 114428517 | A | * | 5/2022 | |
| CN | 114511762 | A | * | 5/2022 | |
| RU | 2609728 | C1 | * | 2/2017 | |
| WO | WO-2021216159 | A2 | * | 10/2021 | ........... B64C 39/024 |

OTHER PUBLICATIONS

CN-109911188-A (Year: 2019).*
CN-112947477-A (Year: 2021).*
CN-113256702-A (Year: 2021).*
CN-113804165-A (Year: 2019).*
RU-2609728-C1 (Year: 2017).*
WO-2021216159-A2 (Year: 2021).*
CN-114428517-A (Year: 2021).*
CN-114511762-A (Year: 2022).*

* cited by examiner

SYSTEMS AND METHODS FOR MEASURING WATER CAPACITY OF POLAR LAKES

CROSS REFERENCE TO RELATED APPLICATIONS

This patent application claims the benefit and priority of Chinese Patent Application No. 202210659942.5, filed on Jun. 13, 2022, the disclosure of which is incorporated by reference herein in its entirety as part of the present application.

BACKGROUND INFORMATION

Technical Field

The present disclosure relates to the technical field of lake water capacity measurement, in particular to systems and methods for measuring water capacity of polar lakes.

Background Art

At present, the exploration speed of humans on the earth is gradually accelerated, and exploration on deep sea and polar areas nearly without human footprint is gradually paid attention to. Scientific investigation actions in the Antarctic region are of great strategic significance. At present, lakes in polar areas are mostly inspected by remote sensing-based macroscopic measurement means, but the lakes are accompanied by ice and snow coverage and are connected with the earth surface all year round. Lake elevation and lake underwater topographic data are difficult to measure through aerial remote sensing, and then water content is accurately evaluated. According to the lake water capacity evaluation method, plumb bob sounding is only carried out through manual driving of a boat, and then the lake water capacity is roughly estimated, so that the measured water content is large in error, and manual measurement work is difficult to carry out for a long time due to the severe environments of the polar areas.

SUMMARY

The present disclosure aims to provide systems and methods for measuring water capacity of polar lakes. Lake elevation and lake underwater topographic data can be automatically measured, so that the water capacity of polar lakes is determined, and the observation accuracy of the polar lakes is improved.

A first aspect of the present disclosure are systems for measuring water capacity of polar lakes, one system embodiment comprising (or consisting essentially of, or consisting of):
a) an unmanned underwater vehicle, an unmanned underwater vehicle-mounted module, an unmanned aerial vehicle, an unmanned aerial vehicle-mounted module and a ground operation module, wherein the unmanned underwater vehicle is used for carrying the unmanned underwater vehicle-mounted module;
b) the unmanned underwater vehicle-mounted module is connected with the unmanned aerial vehicle-mounted module and the ground operation module;
c) the unmanned underwater vehicle-mounted module configured to measure under-lake point cloud data and under-lake single-beam ranging data;
d) the unmanned aerial vehicle configured to carry the unmanned aerial vehicle-mounted module;
e) the unmanned aerial vehicle-mounted module is further connected with the ground operation module;
f) the ground operation module is further connected with the unmanned aerial vehicle and the unmanned underwater vehicle;
g) the ground operation module is configured to acquire a planned path of the unmanned underwater vehicle and control the unmanned aerial vehicle to move along with the unmanned underwater vehicle at a preset height right above the unmanned underwater vehicle by utilizing an active disturbance rejection control (ADRC) algorithm;
h) the unmanned aerial vehicle-mounted module configured to:
i. acquire lake surface point cloud data and attitude data of the unmanned aerial vehicle-mounted module; and
ii. determine coordinate system conversion parameters of the unmanned underwater vehicle and the unmanned aerial vehicle according to the attitude data of the unmanned aerial vehicle-mounted module;
i) the ground operation module configured to:
i. determine the lake surface point cloud data under the geographic coordinate system, the under-lake point cloud data under the geographic coordinate system and the under-lake single-beam ranging data under the geographic coordinate system according to the coordinate system conversion parameters
ii. construct a water three-dimensional topographic map according to the lake surface point cloud data under the geographic coordinate system,
iii. construct a lake coastal three-dimensional topographic map according to the under-lake point cloud data under the geographic coordinate system;
iv. construct a lake bottom three-dimensional topographic map according to the under-lake single-beam ranging data under the geographic coordinate system; and
v. determine the lake water capacity based on the water three-dimensional topographic map, the lake coastal three-dimensional topographic map and the lake bottom three-dimensional topographic map.

Optionally, the unmanned underwater vehicle-mounted module comprises:
a first computer, an underwater single-beam sensor, a linear array laser radar sensor and a first ultra-wideband (UWB) data transmission unit;
the first computer is respectively connected with the underwater single-beam sensor, the linear array laser radar sensor and the first UWB data transmission unit;
the first computer configured to control the underwater single-beam sensor to obtain the under-lake single-beam ranging data;
the first computer is configured to control the linear array laser radar sensor to obtain the under-lake point cloud data;
the first UWB data transmission unit is further connected with the ground operation module; and the first computer is further configured to control the first UWB data transmission unit to transmit the under-lake single-beam ranging data and the under-lake point cloud data.

Optionally, the underwater single-beam sensor is an altimeter known under the trade designation PSA-916, available from Teledyne Benthos Acoustics, or similar sonar altimeter providing accurate distance-to-bottom measurements relative to a fixed position. The altimeter transmits a narrow-beam acoustic signal then measures the round-trip time for the sound pulse to travel from the transducer through the water, reflect off a surface, and return to the transducer. Since the nominal speed of sound through water is known (about 1,500 meters per second), the pulse's travel time can be used to calculate the total distance from the altimeter to the bottom of a water body.

Optionally, the linear array laser radar sensor is a Sagitar 128-line laser radar.

Optionally, the unmanned underwater vehicle-mounted module is further provided with a pose cube and an infrared beacon positioning light array.

Optionally, the unmanned aerial vehicle-mounted module comprises:
  a second computer, a down looking camera, an area array laser radar sensor and a second UWB data transmission unit;
  the second computer is respectively connected with the down looking camera, the area array laser radar sensor and the second UWB data transmission unit;
  the down looking camera is configured to shoot (capture an image of) the pose cube and the infrared beacon positioning light array;
  the second computer is configured to determine attitude data of the unmanned underwater vehicle-mounted module according to the image of the pose cube and an image of the infrared beacon positioning light array, and determine the coordinate system conversion parameters of the unmanned underwater vehicle and the unmanned aerial vehicle according to the attitude data of the unmanned underwater vehicle-mounted module;
  the second computer is configured to control the area array laser radar sensor to obtain the under-lake point cloud data;
  the second UWB data transmission unit is connected with the ground operation module; and the second computer is configured to control the second UWB data transmission unit to transmit the lake surface point cloud data and the coordinate system conversion parameters.

Optionally, the area array laser radar sensor is a 128-line area array laser radar sensor.

Optionally, the unmanned aerial vehicle-mounted module further comprises:
  a holder; and
  the holder is configured to carry the down looking camera and the area array laser radar sensor.

Another aspect of the present disclosure are methods of measuring water capacity of polar lakes using a system for measuring water capacity of polar lakes, one method embodiment comprising:
  a) acquiring a planned path of the unmanned underwater vehicle, and controlling the unmanned aerial vehicle to move along with the unmanned underwater vehicle at a preset height right above the unmanned underwater vehicle by utilizing an ADRC algorithm;
  b) acquiring under-lake point cloud data and under-lake single-beam ranging data;
  c) acquiring lake surface point cloud data and attitude data of the unmanned aerial vehicle-mounted module;
  d) determining coordinate system conversion parameters of the unmanned underwater vehicle and the unmanned aerial vehicle according to the attitude data of the unmanned aerial vehicle-mounted module;
  e) determining the lake surface point cloud data under the geographic coordinate system, the under-lake point cloud data under the geographic coordinate system and the under-lake single-beam ranging data under the geographic coordinate system according to the coordinate system conversion parameters;
  f) constructing a water three-dimensional topographic map according to the lake surface point cloud data under the geographic coordinate system;
  g) constructing a lake coastal three-dimensional topographic map according to the under-lake point cloud data under the geographic coordinate system;
  h) constructing a lake bottom three-dimensional topographic map according to the under-lake single-beam ranging data under the geographic coordinate system; and
  i) determining the lake water capacity based on the water three-dimensional topographic map, the lake coastal three-dimensional topographic map and the lake bottom three-dimensional topographic map.

According to specific embodiments provided by the present disclosure, the present disclosure has the following technical effects.

The present disclosure provides systems and methods for measuring water capacity of polar lakes. In certain embodiments the methods may comprises the steps of controlling the unmanned aerial vehicle to move along with the unmanned underwater vehicle at a preset height right above the unmanned underwater vehicle by utilizing an ADRC algorithm; and obtaining lake surface point cloud data, under-lake point cloud data and under-lake single-beam ranging data so as to construct the water three-dimensional topographic map, the lake coastal three-dimensional topographic map and the lake bottom three-dimensional topographic map under the same coordinate system, and then determining the lake water capacity.

By arranging the unmanned underwater vehicle, the unmanned underwater vehicle-mounted module, the unmanned aerial vehicle and the unmanned aerial vehicle-mounted module, lake elevation and lake underwater terrain data are automatically measured, so that the observation precision of polar lakes is improved.

BRIEF DESCRIPTION OF THE DRAWINGS

The manner in which the objectives of this disclosure and other desirable characteristics can be obtained is explained in the following description and attached drawings in which.

Figure 1:
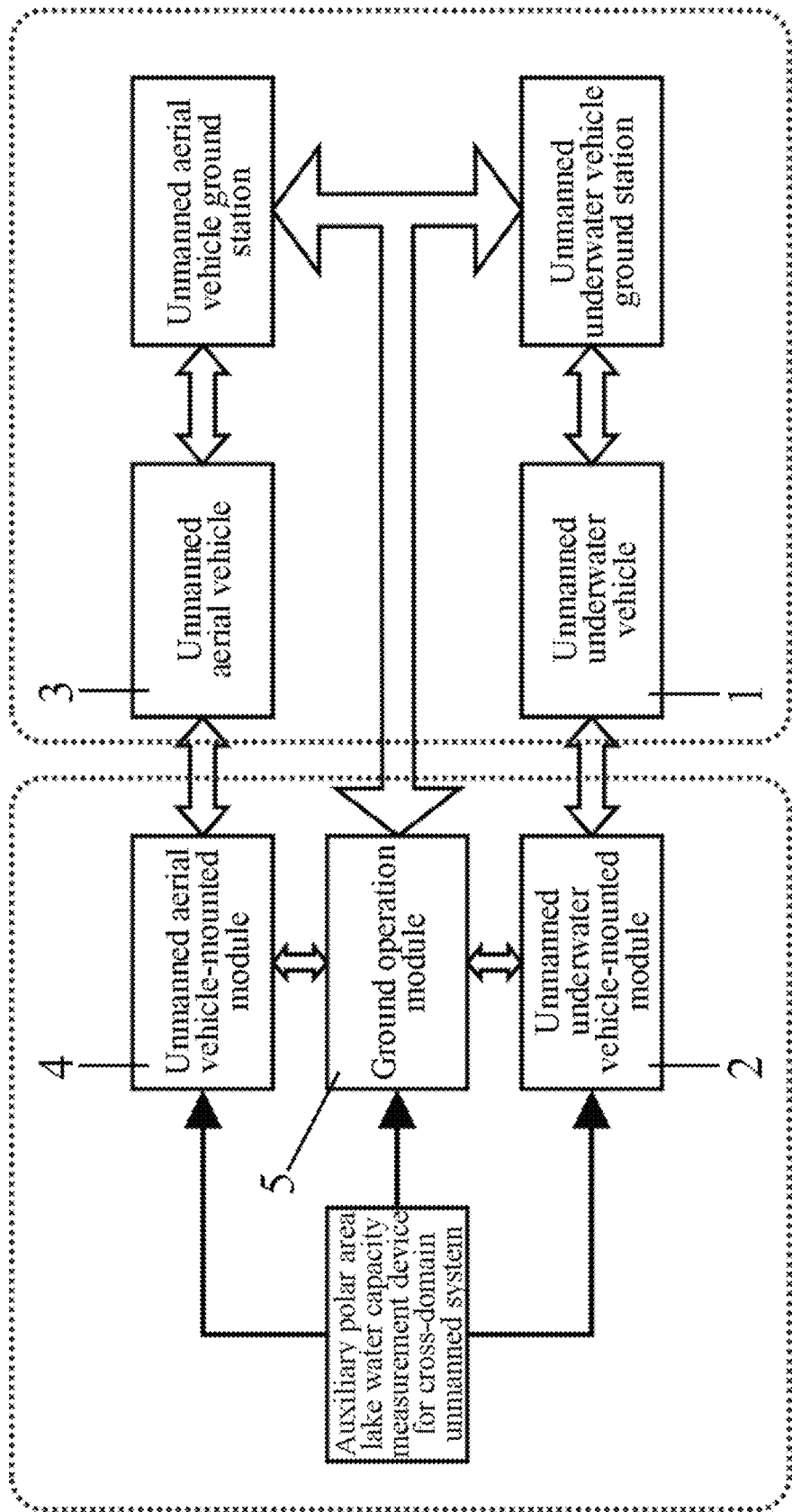
FIG. 1 is a structural schematic diagram of a system for measuring water capacity of polar lakes in the first embodiment of the present disclosure.

It is to be noted, however, that the appended drawings are not to scale, and illustrate only typical system and method embodiments of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

The following clearly and completely describes the technical scheme in the embodiments of the present disclosure with reference to the attached figures in the embodiments of the present disclosure. The described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide a system and a method for measuring water capacity of polar lakes. Lake elevation and lake underwater topographic data can be automatically measured, so that the water capacity of polar lakes is determined, and the observation accuracy of the polar lakes is improved.

To make the foregoing objective, features and advantages of the present disclosure clearer and more comprehensible, the present disclosure is further described in detail below with reference to the figures and specific embodiments.

Embodiment I

As illustrated in FIG. 1, one embodiment provides a system for measuring water capacity of polar lakes, the system comprising an unmanned underwater vehicle 1, an unmanned underwater vehicle-mounted module 2, an unmanned aerial vehicle 3, an unmanned aerial vehicle-mounted module 4 and a ground operation module 5, wherein unmanned underwater vehicle 1 is used for carrying unmanned underwater vehicle-mounted module 2; unmanned underwater vehicle-mounted module 2 is connected with unmanned aerial vehicle-mounted module 4 and ground operation module 5. Unmanned underwater vehicle-mounted module 2 is used for measuring under-lake point cloud data and under-lake single-beam ranging data. Unmanned aerial vehicle 3 is used for carrying unmanned aerial vehicle-mounted module 4. Unmanned aerial vehicle-mounted module 4 is further connected with ground operation module 5, and ground operation module 5 is further connected with unmanned aerial vehicle 3 and unmanned underwater vehicle 1. Ground operation module 5 is used for acquiring a planned path of unmanned underwater vehicle 1 and controlling unmanned aerial unmanned vehicle 3 to move along with unmanned underwater vehicle 1 at a preset height right above unmanned underwater vehicle 1 by utilizing an ADRC algorithm. Unmanned aerial vehicle-mounted module 4 is used for acquiring lake surface point cloud data and attitude data of unmanned aerial vehicle-mounted module 4. Unmanned aerial vehicle-mounted module 4 is further used for determining coordinate system conversion parameters of unmanned underwater vehicle 1 and unmanned aerial vehicle 3 according to the attitude data of unmanned aerial vehicle-mounted module 4. Ground operation module 5 is further used for determining the lake surface point cloud data under the geographic coordinate system, the under-lake point cloud data under the geographic coordinate system and the under-lake single-beam ranging data under the geographic coordinate system according to coordinate system conversion parameters. Ground operation module 5 is further used for constructing a water three-dimensional topographic map according to the lake surface point cloud data under the geographic coordinate system. Ground operation module 5 is further used for constructing a lake coastal three-dimensional topographic map according to the under-lake point cloud data under the geographic coordinate system. Ground operation module 5 is further used for constructing a lake bottom three-dimensional topographic map according to the under-lake single-beam ranging data under the geographic coordinate system. Ground operation module 5 is further used for determining the lake water capacity based on the water three-dimensional topographic map, the lake coastal three-dimensional topographic map and the lake bottom three-dimensional topographic map.

In certain embodiments, the unmanned underwater vehicle-mounted module 2 comprises a first computer, an underwater single-beam sensor, a linear array laser radar sensor and a first UWB data transmission unit. The first computer is respectively connected with the underwater single-beam sensor, the linear array laser radar sensor and the first UWB data transmission unit. The first computer is used for controlling the underwater single-beam sensor to obtain the under-lake single-beam ranging data, and for controlling the linear array laser radar sensor to obtain the under-lake point cloud data. The first UWB data transmission unit is further connected with ground operation module 5, and the first computer is further used for controlling the first UWB data transmission unit to transmit the under-lake single-beam ranging data and the under-lake point cloud data. Specifically, the model of the underwater single-beam sensor is PSA-916; and the model of the linear array laser radar sensor is a Sagitar 128-line laser radar.

Moreover, unmanned underwater vehicle-mounted module 2 is further provided with a pose cube and an infrared beacon positioning light array 7. When the attitudes of unmanned underwater vehicle 1 are different, the states of pose cube and the infrared beacon positioning light array 7 are different.

Unmanned aerial vehicle-mounted module 4 comprises a second computer, a holder 8, a down looking camera 6, an area array laser radar sensor and a second UWB data transmission unit. The second computer is respectively connected with down looking camera 6, the area array laser radar sensor and the second UWB data transmission unit. Holder 8 with an anti-shaking function is used for carrying down looking camera 6 and the area array laser radar sensor. Down looking camera 6 is used for shooting (capturing images of) pose cube and the infrared beacon positioning light array 7. The second computer is used for determining attitude data of unmanned underwater vehicle-mounted module 2 according to an image of pose cube and infrared beacon positioning light array 7, and determining the coordinate system conversion parameters of unmanned underwater vehicle 1 and unmanned aerial vehicle 3 according to the attitude data of unmanned underwater vehicle-mounted module 2. The second computer is used for controlling the area array laser radar sensor to obtain the under-lake point cloud data. The second UWB data transmission unit is connected with ground operation module 5. The second computer is used for controlling the second UWB data transmission unit to transmit the lake surface point cloud data and the coordinate system conversion parameters. In certain embodiments, the area array laser radar sensor is a 128-line area array laser radar sensor.

Embodiment II

The second embodiment provides a system for measuring water capacity of polar lakes. The system is applied to lake water capacity measurement of cross-domain polar lakes, and has the main functions of achieving cooperative work control for a cross-domain unmanned system and achieving synchronization of all sensor data time axes and same-dimension pose coordinate conversion of an observation unit.

The device is divided into three parts of an unmanned aerial vehicle-mounted module 4, a ground operation module 5 and an unmanned underwater vehicle-mounted module 2. Unmanned aerial vehicle-mounted module 4 is mainly mounted on an unmanned aerial vehicle platform, and comprises an NVIDIA TX2 microcomputer, a data transmission module, a down looking camera 6, an anti-shaking holder, an area array laser radar and a UWB module. Ground operation module 5 is mainly an operation ground staff operating platform, and comprises a ground microcomputer carried with a 3060Ti NVIDIA video card, two data transmission modules, and a UWB module. Unmanned underwater vehicle-mounted module 2 is mainly mounted on an unmanned underwater vehicle platform, and comprises an NVIDIA TX2 microcomputer, a data transmission module, an underwater single-beam sensor, a pose cube 7, an infrared beacon positioning light array, a linear array laser radar and a UWB module.

Connection and control of the device with the cross-domain unmanned system (a unmanned aerial vehicle 3 and an unmanned aerial vehicle ground station, and an unmanned underwater vehicle 1 and an unmanned underwater vehicle ground station) are described as follows: a ground microcomputer is connected with an unmanned underwater vehicle 1 and a ground station microcomputer control system of unmanned aerial vehicle 3 through an industrial bus, and operation plans of unmanned underwater vehicle 1 and unmanned aerial vehicle 3 are connected to a cross-domain comprehensive measurement system; and in addition, an RTK base station used by unmanned aerial vehicle 3 and unmanned underwater vehicle 1 is further carried on the bus, and unmanned aerial vehicle 3 cooperates with unmanned underwater vehicle 1 to work through a UWB positioning communication module. Underwater single-beam sensor and the 16-line laser radar are mounted on an unmanned underwater vehicle operation platform, and an area array laser radar is mounted on the unmanned aerial vehicle operation platform. The three-dimensional terrain of the lake area is measured through a ground microcomputer terminal, and related parameters related to the water content of the lakes are estimated. For example, current water content is measured, so that the maximum lake water content is estimated, lake future injected water volume is estimated, and lake future evaporated water volume is estimated.

The ground microcomputer module is used as a direct user operation platform of the whole cross-domain lake measurement system, and provides an ROS robot interaction system interface under a Ubuntu18.04 version Linux embedded system used by external users. Firstly, a service control platform compatible with an industrial bus is established by utilizing an Ethernet interface of a Ubuntu embedded system, so that a user (scientific research team member) controls and operates C#scripts with acquisition and measurement functions through the bus. After the user terminal establishes remote control connection with the unmanned underground vehicle ground microcomputer system and the unmanned aerial vehicle ground microcomputer system through the bus, the user terminal can issue a control instruction to the unmanned system operation end, and state information and measured real-time data (if remote data transmission is involved, large-capacity data similar to point cloud is stored in a local machine) are fed back to a user (scientific research team member) terminal.

RTK modules provide custom-made coordinates with the precision within 2 cm for unmanned aerial vehicle 3 and unmanned underwater vehicle 1, each device is provided with a corresponding RTK module, and unmanned aerial vehicle 3 and the unmanned underwater vehicle platform are provided with corresponding RTK antenna receiving ends. A D-rtk2 type RTK base station is used by unmanned aerial vehicle 3, and a single-point RTK positioning module is used by unmanned underwater vehicle 1. GPS data used for modeling are D-RTK2 data, and the unmanned underwater vehicle RTK is only used for track planning and underwater modeling.

The UWB module is used for positioning of unmanned underwater vehicle 1 in a valley with poor signals and relative position recording and communication of a cross-domain system, and the module does not need to be arranged in an open area. The module can be arranged in a water area of a special geological structure needing depth measurement, such as a rock cave. The module is provided with four positioning base stations, and a communication positioning module is installed on unmanned underwater vehicle 1 and used for determining the position of unmanned underwater vehicle 1. The UWB module has good penetrability and a positioning function.

An unmanned aerial vehicle-mounted observation module is a unit for measuring three-dimensional structures of canyons and surrounding rock, soil and snow mountains. An observation sensor mainly uses the area array laser radar, and the laser radar can perform three-dimensional modeling on the part above the water surface of the lake. In addition, the down looking camera can obtain an orthographic image with elevation information in combination with DRTK-2. Therefore, the orthographic area of a shot object is calculated (at the moment, the measured object can be the area of a water area or the area of floating ice floating on lake water). The operation unit obtains two types of sensor data, the first type is point cloud data obtained by the laser radar, and the second type is the orthographic image obtained by a high-resolution camera. The two types of data are of corresponding pose information therein. Corresponding three-dimensional imaging data can be obtained at the unmanned aerial vehicle ground station.

The unmanned underwater vehicle observation module is a load operation platform used for lake water area bottom terrain modeling and lake coastal terrain modeling. The model of the underwater single-beam sensor is measured to be PSA-916, and the model of the linear array laser radar sensor is measured to be a Sagitar 128-line laser radar. Wherein the single-beam sensor is used for establishing a three-dimensional terrain at the bottom of the lake, and the Sagitar 128-line laser radar is used for establishing a three-dimensional terrain of a connected area of the lake and a surrounding mountain body.

The submodules, such as the TX2 microcomputer and the down looking camera, of the device mounted on the unmanned aerial vehicle, and the submodules, such as the infrared beacon positioning light array and the pose cube mounted on the unmanned underwater vehicle are involved. The TX2 microcomputer located on the unmanned aerial vehicle receives the infrared beacon positioning light array and the pose cube which are collected by the down looking camera, and the distance, rolling, pitching and course information of the positioning light array is obtained through the visual principle. The pose cube serves as a second information source that supplements rolling and pitching information. The part is used for ensuring the consistency of vertical coordinates under the condition of controlling the alignment of sensing observation time axes in the cross-domain cooperative operation of the unmanned aerial vehicle and the unmanned underwater vehicle. It is ensured that the unmanned aerial vehicle is always kept at the position with the vertical height of 20 m above the unmanned underwater vehicle, and data obtained during laser radar and single-beam modeling are actual terrain corresponding data.

The Profinet bus embedded equipment module is used for connecting the user terminal microcomputer, the unmanned aerial vehicle ground microcomputer, the unmanned underwater vehicle ground microcomputer, the UWB control module and the ground communication antenna control module into a topological structure through an industrial bus. The user can communicate in real time through the user terminal microcomputer, any equipment on the bus can be controlled, and mutual cooperation of all units of all cross-domain systems is achieved.

Figure 2:
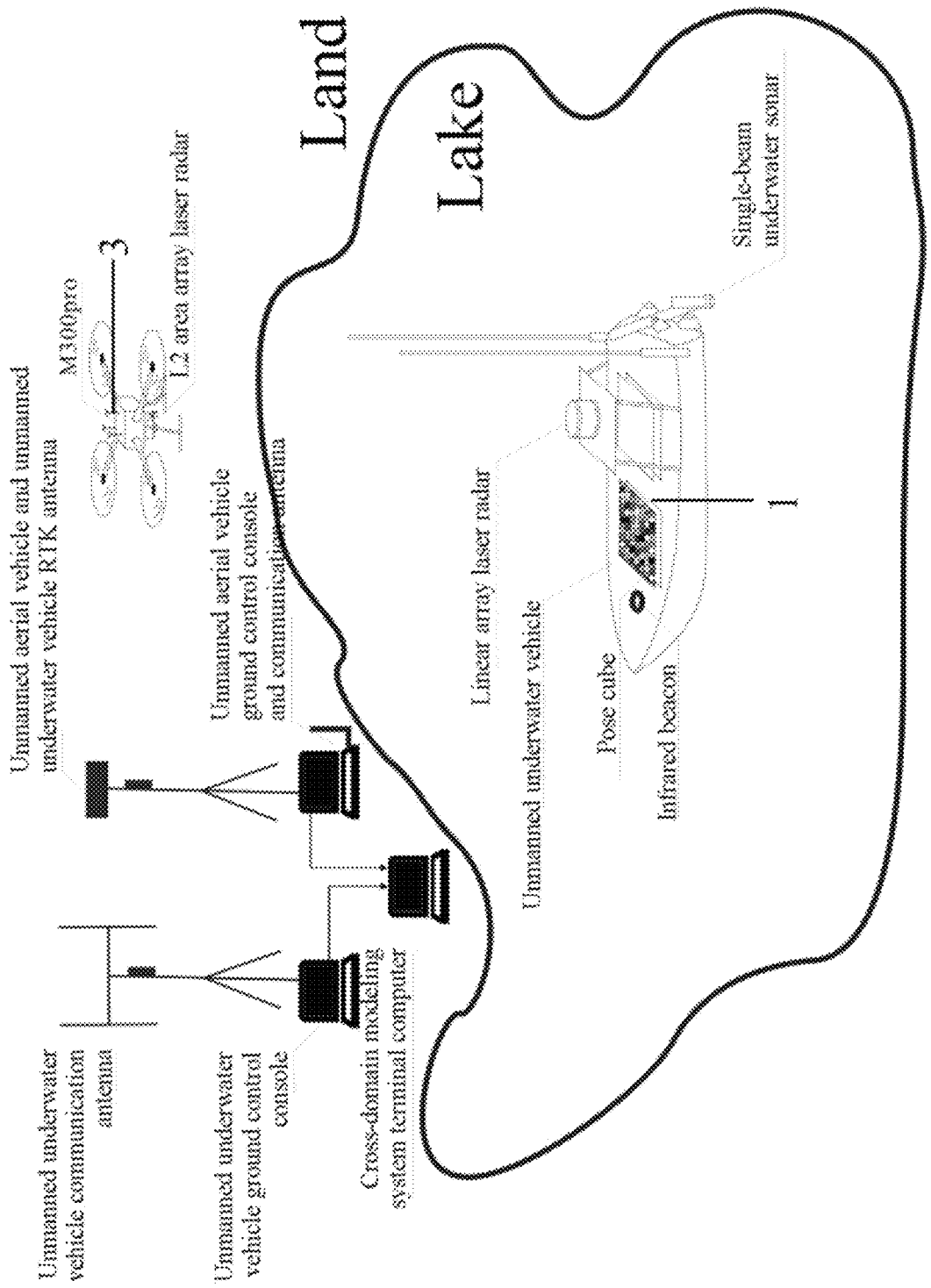
FIG. 2 is a schematic diagram of system operation in the second embodiment of the present disclosure.
Figure 3:
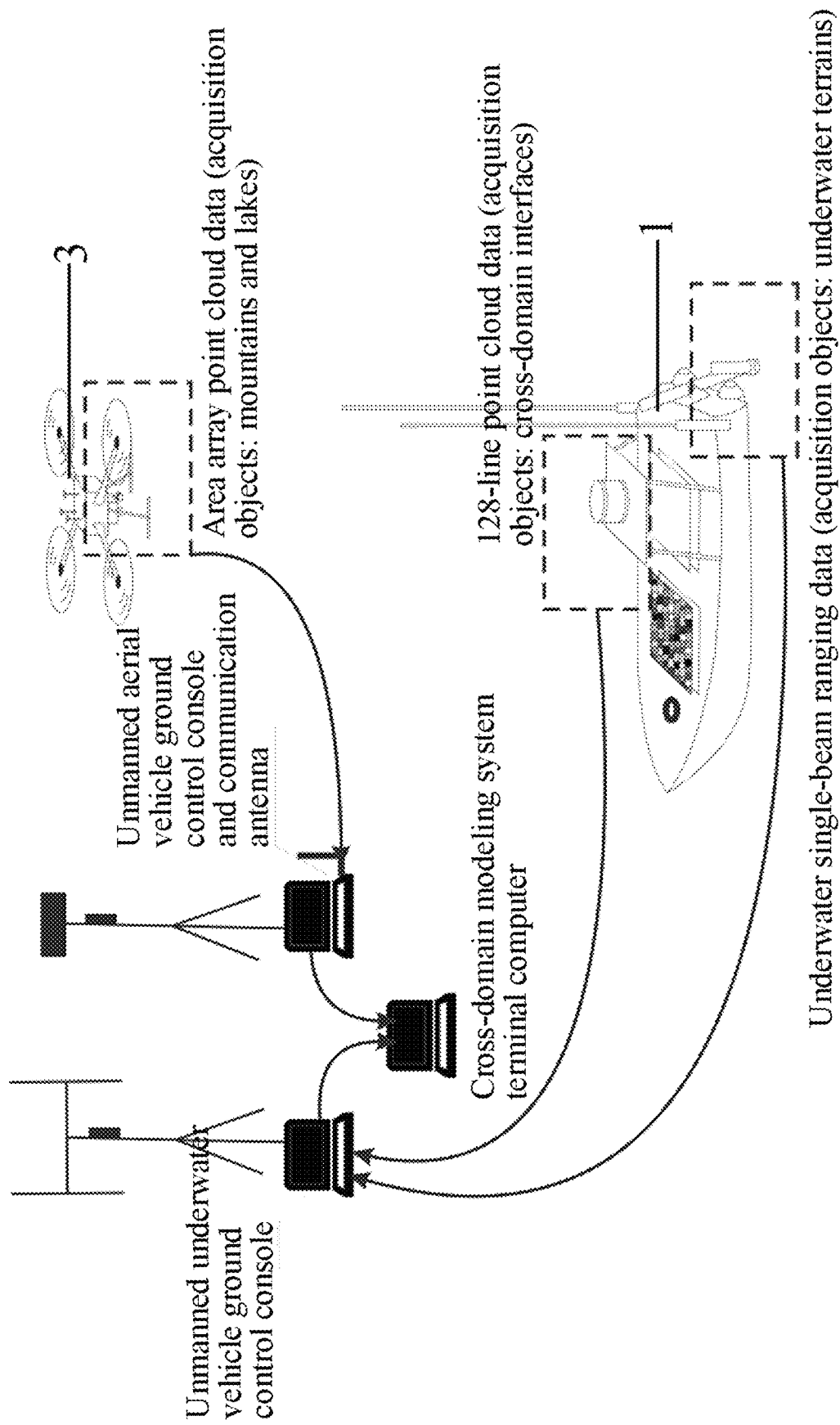
FIG. 3 is a schematic diagram of data acquisition type in the second embodiment of the present disclosure.
Figure 4:
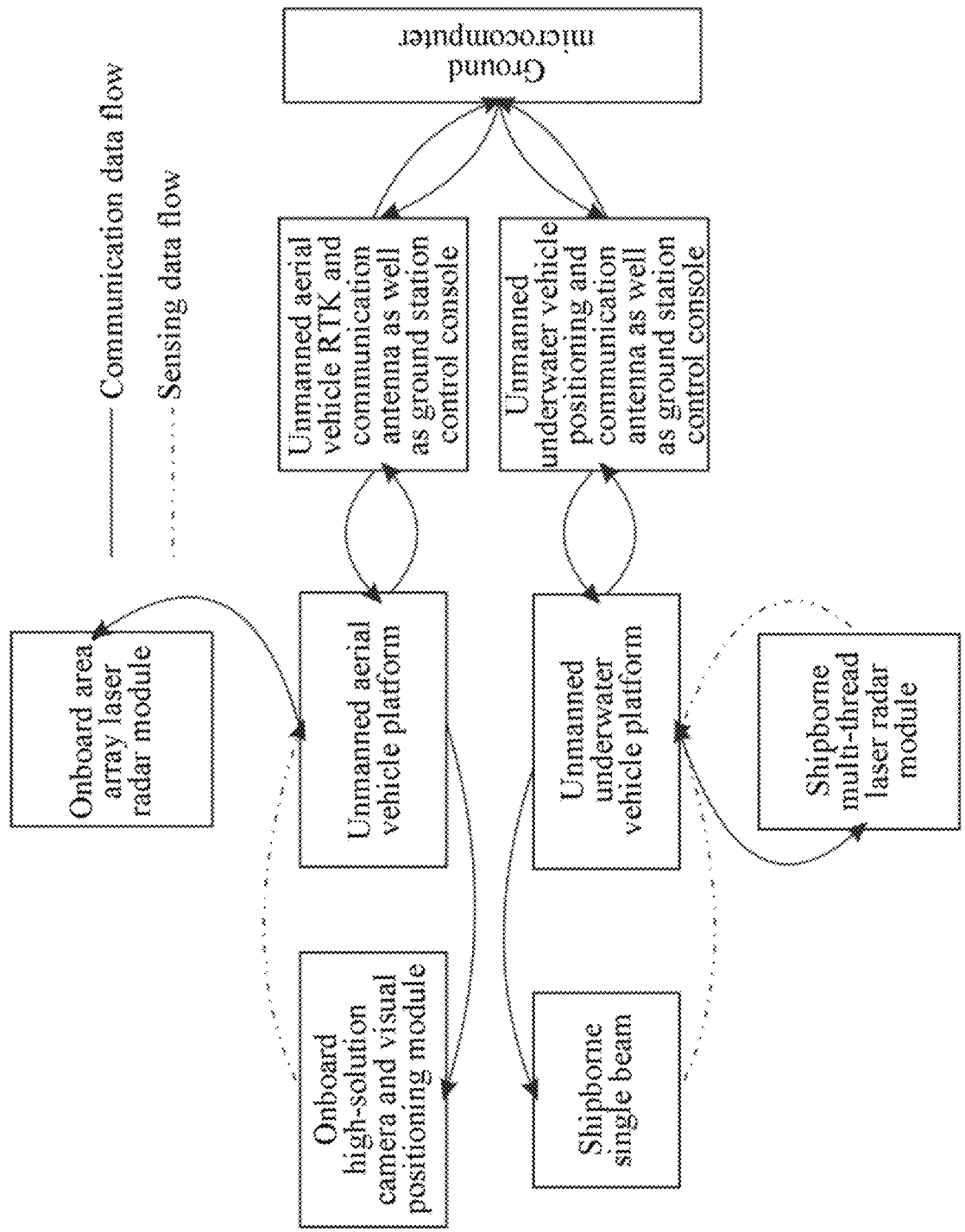
FIG. 4 is a schematic diagram of system information flow direction in the second embodiment of the present disclosure.
Figure 5:
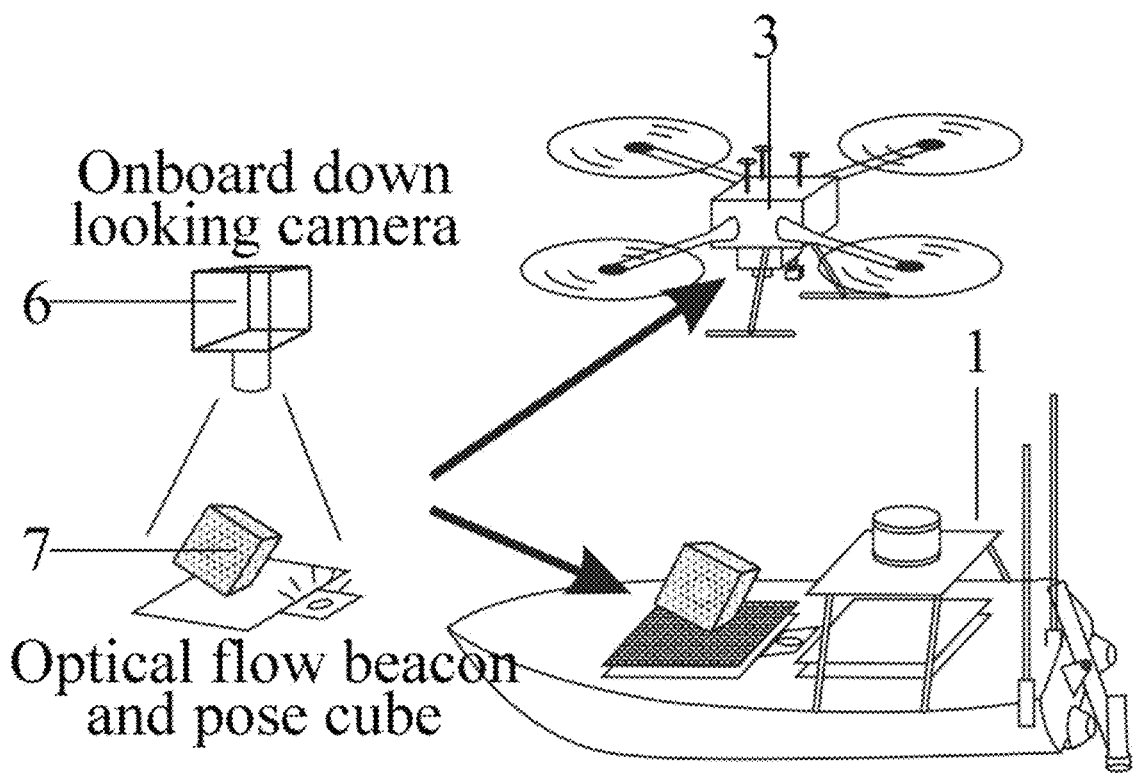
FIG. 5 is a schematic diagram of a cross-domain unmanned aerial vehicle and unmanned underwater vehicle coordinated positioning module in the second embodiment of the present disclosure.
Figure 6:
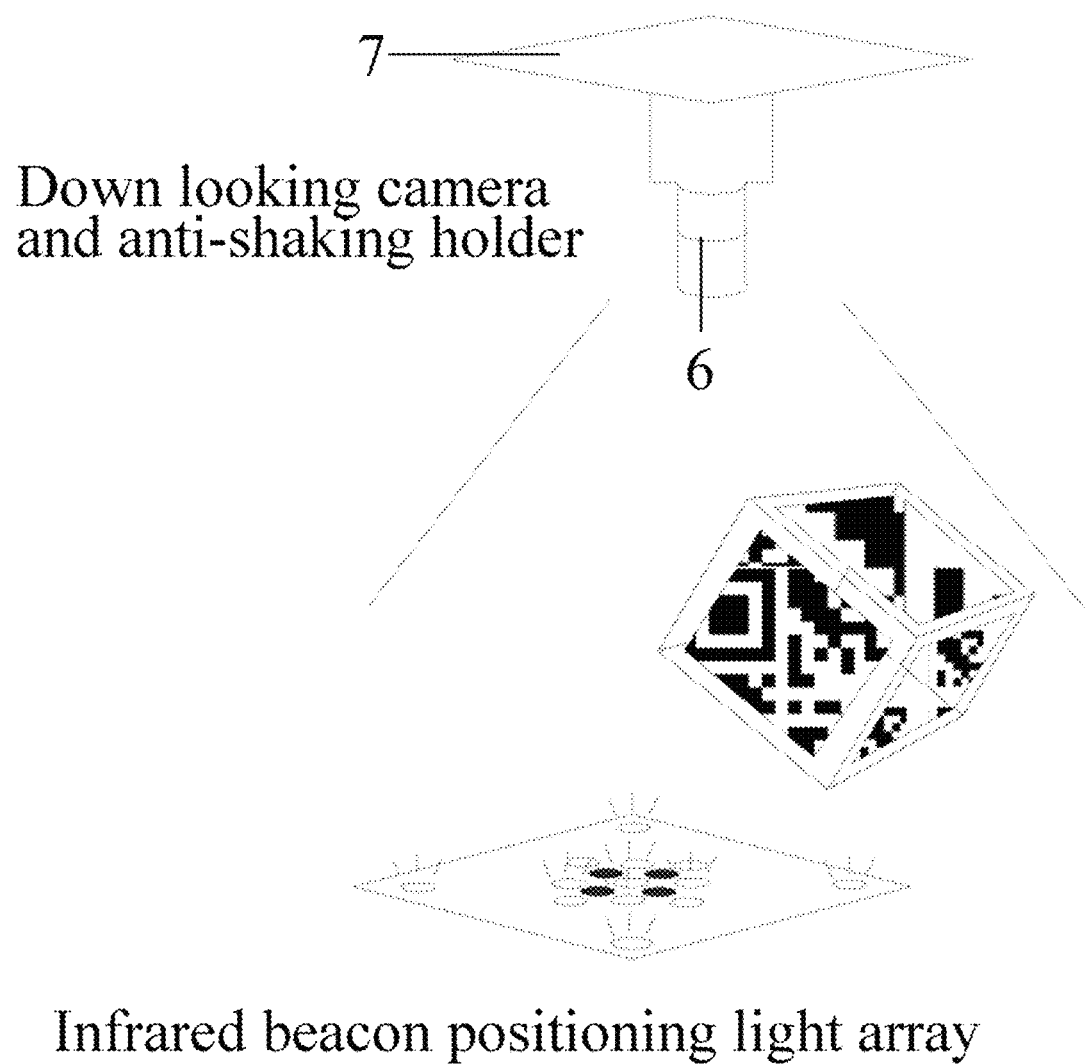
FIG. 6 is a coordinated operation diagram of an infrared beacon positioning light array, a pose cube and a down looking camera in the second embodiment of the present disclosure.

As illustrated in FIGS. 2, 3 and 4, the operation space demarcation of the whole cross-domain unmanned operation platform is carried out on the basis that the unmanned underwater vehicle carries out geo-fencing on the lake along the bank. Firstly, unmanned underwater vehicle 1 carries out high-precision GPS point location collection along the lake (the lake elevation is fixed by default), and then the geo-fence range of the feasible track of the lake water is obtained. The obtained geographic information coordinates are jointly input into an unmanned underwater vehicle ground control console and an unmanned aerial vehicle ground control console, and the two control consoles respectively perform flight path planning and flight line speed planning with the relative elevation of 50 m or 100 m on unmanned underwater vehicle 1 and unmanned aerial vehicle 3. In order to ensure the safety and smooth operation of the cross-domain system, the priority of the route in the operation process is that unmanned underwater vehicle 1 is greater than unmanned aerial vehicle 3. That is, unmanned aerial vehicle 3 constantly follows unmanned underwater vehicle 1 to perform measurement right above unmanned underwater vehicle 1. At the moment, a sensing data sequence of the same geographic information coordinate longitude and latitude at the same related time can be obtained. Through the double corresponding relation of time and space, three types of modeling data are placed in the same four-dimensional coordinate system (longitude, latitude, elevation and time), and overall modeling and measurement operation of the lake are achieved according to the coordinate system in the subsequent modeling process. As illustrated in FIGS. 5 and 6, in the overall operation description of the system, the part of unmanned aerial vehicle 3 cooperating with unmanned underwater vehicle 1 is involved. The final purpose of the action is to achieve data synchronism at the same longitude and latitude, at the same time and at different heights. The onboard down looking camera 6 in FIG. 5 recognizes the optical flow beacon of unmanned underwater vehicle 1, it is ensured that the pixel is at a fixed position in the field of view of the unmanned aerial vehicle-mounted down looking camera, namely, the center of unmanned aerial vehicle 3 defaults to the center of an onboard camera lens, and the center of unmanned underwater vehicle 3 defaults to the center of the optical flow beacon. The pose cube is a sign for assisting the optical flow beacon in confirming the motion state of unmanned underwater vehicle 1. Unmanned aerial vehicle 3 can confirm left-right shaking, turning around, reversing, advancing and other actions of the vehicle body through the pose.

Two types of laser radars and one single-beam sensor are used for respectively collecting three-dimensional models of terrains in air and in water. The area array laser radar mounted on the unmanned aerial vehicle is used for establishing surface three-dimensional features above the lake surface. The 128-line laser radar mounted on unmanned underwater vehicle 1 is used for collecting ice and snow on the surface of a lake and the three-dimensional structure of the surrounding earth surface. The single-beam sensor mounted on unmanned underwater vehicle 1 is used for collecting the three-dimensional structure of the terrain at the bottom of the lake (a three-dimensional surface is established in a multi-point depth sampling and curved surface fitting mode). The system is high in modularization degree, high in measurement means and convenient to extend bus equipment. The user terminal can conveniently realize automatic measurement (measurement results comprise an underwater terrain three-dimensional structure, a water-gas interface surface three-dimensional structure and a lake area rock-soil surface three-dimensional structure) through the bus. For the problem that cross-domain sensing fusion is difficult, submodules combined with the light array and the pose cube are arranged, so that the problems of inaccurate sensing data and measurement errors caused by pose changes are solved. Therefore, the original complex and high-cost polar lake measurement work can be carried out in a short time, and the acquired data are more accurate.

Embodiment III

This embodiment provides another method for measuring water capacity of polar lakes in accordance with the present disclosure. The method is applied to the system for measuring water capacity of polar lakes in the first embodiment, and the method comprises the following steps:

acquiring a planned path of unmanned underwater vehicle 1, and controlling unmanned aerial vehicle 3 to move along with unmanned underwater vehicle 1 at a preset height right above unmanned underwater vehicle 1 by utilizing an ADRC algorithm;

acquiring under-lake point cloud data and under-lake single-beam ranging data;

acquiring lake surface point cloud data and attitude data of unmanned aerial vehicle-mounted module 4;

determining coordinate system conversion parameters of unmanned underwater vehicle 1 and unmanned aerial vehicle 3 according to the attitude data of unmanned aerial vehicle-mounted module 4;

determining the lake surface point cloud data under the geographic coordinate system, the under-lake point cloud data under the geographic coordinate system and the under-lake single-beam ranging data under the geographic coordinate system according to the coordinate system conversion parameters;

constructing a water three-dimensional topographic map according to the lake surface point cloud data under the geographic coordinate system;

constructing a lake coastal three-dimensional topographic map according to the under-lake point cloud data under the geographic coordinate system;

constructing a lake bottom three-dimensional topographic map according to the under-lake single-beam ranging data under the geographic coordinate system; and determining the lake water capacity based on the water three-dimensional topographic map, the lake coastal three-dimensional topographic map and the lake bottom three-dimensional topographic map.

Specifically, in the embodiment, when unmanned aerial vehicle-mounted module 4 and unmanned underwater vehicle-mounted module 2 work cooperatively, a method of ensuring pose synchronization of an observation data acquisition platform is provided, comprising the following steps:

Step one, determining the pose information of the unmanned aerial vehicle through RTK positioning and the pose of unmanned aerial vehicle 3, so that the accurate pose of unmanned underwater vehicle 1 and unmanned aerial vehicle 3 under the geodetic coordinate system can be obtained.

Step two, acquiring an infrared beacon positioning optical array and pose cubic information of unmanned aerial vehicle 3 by unmanned aerial vehicle-mounted module 4. After calculation by a TX2 microcomputer carried by unmanned aerial vehicle 3, an obtained pose is fed back to unmanned aerial vehicle 3, so that pose information of unmanned underwater vehicle 1 relative to unmanned aerial vehicle 3 is obtained. According to the calculation principle, the pose state is acquired based on a direct linear conversion and feature point calculation method.

The specific flow is as follows.

Firstly, unmanned aerial vehicle-mounted equipment 4 acquires image information of a positioning light array and a pose cube 7 of unmanned aerial vehicle.

Secondly, the image sensor feeds information back to the unmanned aerial vehicle-mounted microcomputer for data calculation. Coding information of each surface of a cube in a position posture is firstly detected to obtain a corresponding ID, and position coordinates of a visual angle of the cube are generated.

Figure 7:
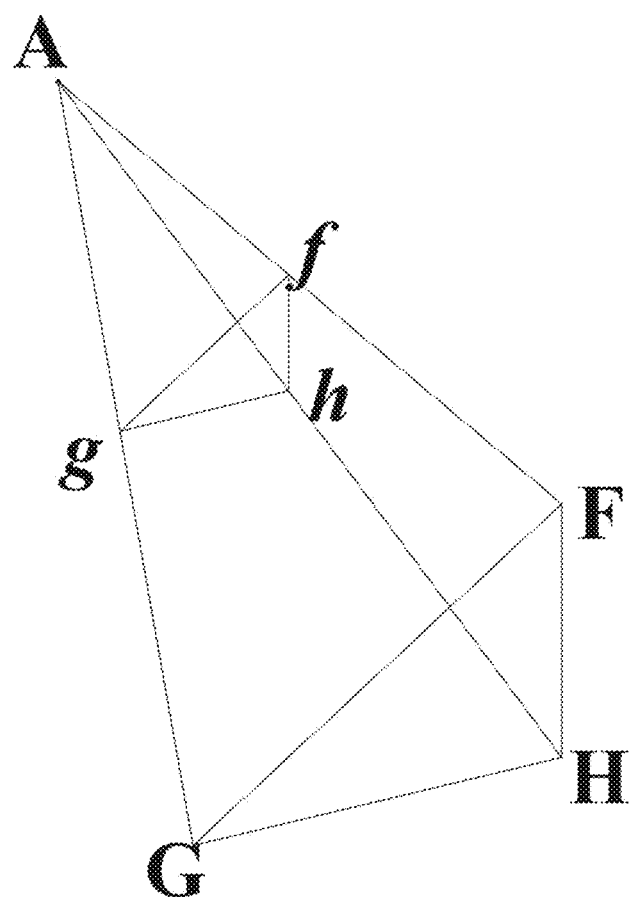
FIG. 7 is a schematic diagram of three-point feature resolving in the third embodiment of the present disclosure.

Thirdly, in the previous step, focal length information is obtained by positioning the specific sizes of the optical array and the cube and the pixel size of the optical array and the cube in the field of view, the principle of a three-point feature detection method is as illustrated in FIG. 7. F, G and H represent feature points on the measured object (a pose cube surface on the unmanned underwater vehicle-mounted platform), and f, g and h are corresponding positions of the feature point F, the feature point G and the feature point H on an imaging plane (inside an unmanned aerial vehicle-mounted camera). The boundary dimensions of the measured object (the actual size of the pose cube is known) are the lengths of FG, FH and GH, the coordinates of f, g and h are obtained through an algorithm. The distance from the point A to the image plane is the focal length f, the side length of the triangle fgh is known (the pixel point inside the imaging plane), and the lengths of the line segment Ag, the line segment Af and the line segment Ah can be determined according to the law of cosines.

Fourthly, based on the three-point features of each surface of the cube, through the law of cosines and an elimination method, $$\begin{cases} Af^2 + Ag^2 - fg^2 = 2\cos\angle fAg \cdot Af \cdot Ag \\ Af^2 + Ah^2 - fh^2 = 2\cos\angle fAh \cdot Af \cdot Ah \\ Ag^2 + Ah^2 - gh^2 = 2\cos\angle gAh \cdot Ag \cdot Ah \end{cases}$$

the cosine of an angle combined by of the focal point and the three points of the target is calculated:

$$\begin{cases} \cos\angle FAG = \dfrac{AF^2 + AG^2 - FG^2}{2AF \cdot AG} \\ \cos\angle FAH = \dfrac{AF^2 + AH^2 - FH^2}{2AF \cdot AH} \\ \cos\angle GAH = \dfrac{AG^2 + AH^2 - GH^2}{2AG \cdot AH} \end{cases}$$

Therefore, x=FG, y=GH, z=FH, a=Ah, b=Af, c=Ag, α=∠FAH, β=∠GAH, γ=∠FAH

The coordinates of the target detection points (F, G, H) relative to the focus of the unmanned aerial vehicle-mounted camera are calculated and obtained. The coordinates ($X_{FM}$, $Y_{FM}$, $Z_{FM}$) of the feature point F of the measured object in the camera coordinate system (M), the coordinates ($X_{GM}$, $Y_{GM}$, $Z_{GM}$) of the feature point G of the measured object in the camera coordinate system and the coordinates ($X_{HM}$, $Y_{HM}$, $Z_{HM}$) of the feature point H of the measured object in the camera coordinate system are calculated through the parameters a, b, c, the camera focal length, the coordinates ($x_f$, $y_f$) of the point f in the image plane, the coordinates ($x_g$, $y_g$) of the point g in the image plane, the coordinates ($x_h$, $y_h$) of the point h in the image plane and the image center coordinates ($u_0$, $v_0$):

$$\begin{cases} X_{FM} = \dfrac{a(x_f - u_0)}{Af} \\ Y_{FM} = \dfrac{a(y_f - v_0)}{Af} \\ Z_{FM} = \dfrac{af}{Af} \end{cases}$$

$$\begin{cases} X_{GM} = \dfrac{b(x_g - u_0)}{Af} \\ Y_{GM} = \dfrac{b(y_g - v_0)}{Af} \\ Z_{GM} = \dfrac{bf}{Af} \end{cases}$$

$$\begin{cases} X_{HM} = \dfrac{c(c_g - u_0)}{Af} \\ Y_{HM} = \dfrac{c(c_g - v_0)}{Af} \\ Z_{HM} = \dfrac{cf}{Af} \end{cases}$$

Figure 8:
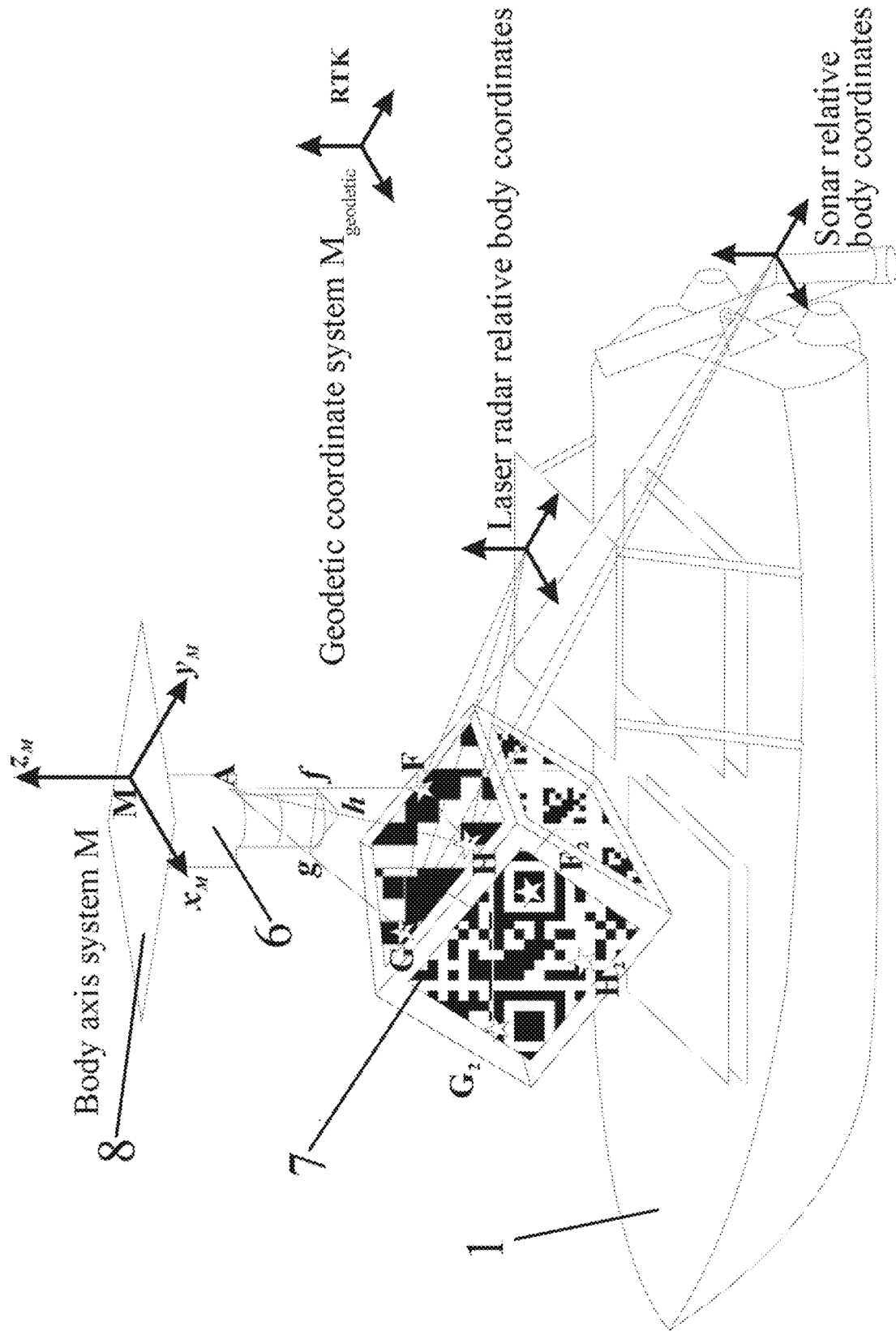
FIG. 8 is a schematic diagram of conversion of relative coordinate position in the third embodiment of the present disclosure.

At present, position information of a target detection point relative to THE camera is obtained, wherein ($X_{FM}$, $Y_{FM}$, $Z_{FM}$), ($X_{GM}$, $Y_{GM}$, $Z_{GM}$) and ($X_{HM}$, $Y_{HM}$, $Z_{HM}$) are coordinates of three feature points on the pose cube (a coordinate system is a body coordinate system). As illustrated in FIG. 8, the pose cube coordinates of the unmanned underwater vehicle load under the body coordinate system are obtained by the formula. The unmanned underwater vehicle load and the unmanned underwater vehicle are rigid bodies, and therefore, the coordinates of the onboard laser radar and the underwater sonar can also be obtained. Pose conversion between an unmanned aerial vehicle-mounted camera coordinate system and a measured object can be realized through two matrix functions of rotation and translation.

Step three, in order to ensure that the time axis of the observation data is aligned and the pose is consistent, taking the unmanned aerial vehicle as a unit which is more flexible in movement and faster in sensing data departure, adjusting the pose through an active disturbance rejection controller ADRC by the unmanned aerial vehicle, so that it is ensured that the unmanned aerial vehicle is located right above the unmanned underwater vehicle, and the relative height is 20 m.

Step four, acquiring area array laser radar observation data by the unmanned aerial vehicle, and acquiring linear array laser radar observation data and underwater single-beam data by the unmanned underwater vehicle. The longitudes and latitudes of the three types of data in the geographic coordinate system are aligned by the device, and alignment means that under the same time axis, the longitude and latitude error in the geographic coordinate system of all observation units does not exceed 2 cm, and the error of the absolute altitude difference value moving along with the time axis does not exceed 2 cm. The result of the second step is the generation of the respective relative coordinate system and conversion matrix with the geographic coordinate system. According to an ADRC expanded control algorithm in the third step, it is ensured that the unmanned aerial vehicle follows the unmanned underwater vehicle under the condition that the unmanned aerial vehicle carries the load to do relatively static operation.

Step five, acquiring the three types of observed data and the unmanned aerial vehicle RTK data under the same time axis by a microcomputer system located on the ground. Terrain modeling is carried out on the laser radar data through a cartography algorithm, and three-dimensional modeling is obtained on the underwater sonar data through an origin curved surface fitting function. In combination with various three-dimensional models with geodetic coordinate systems, the three-dimensional models are imported into written software to generate a three-dimensional structure, and parameters such as the water storage amount, the maximum water soluble amount and the water area of the lake are obtained.

All embodiments in this specification are described in a progressive manner. Each embodiment focuses on differences from other embodiments. For the part that is the same or similar between different embodiments, reference may be made between the embodiments. The system disclosed in the embodiment corresponds to the method disclosed in the embodiment, and therefore the description is relatively brief. Related information refers to descriptions of the related parts in the method.

Several examples are used for illustration of the principles and implementation of systems and methods of the present disclosure. The description of the embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A system for measuring water capacity of polar lakes, comprising:
   a) an unmanned underwater vehicle, an unmanned underwater vehicle-mounted module, an unmanned aerial vehicle, an unmanned aerial vehicle-mounted module and a ground operation module, wherein the unmanned underwater vehicle is used for carrying the unmanned underwater vehicle-mounted module;
   b) the unmanned underwater vehicle-mounted module is connected with the unmanned aerial vehicle-mounted module and the ground operation module;
   c) the unmanned underwater vehicle-mounted module configured to measure under-lake point cloud data and under-lake single-beam ranging data;
   d) the unmanned aerial vehicle configured to carry the unmanned aerial vehicle-mounted module;
   e) the unmanned aerial vehicle-mounted module is further connected with the ground operation module;
   f) the ground operation module is further connected with the unmanned aerial vehicle and the unmanned underwater vehicle;
   g) the ground operation module is configured to acquire a planned path of the unmanned underwater vehicle and control the unmanned underwater vehicle to move along with the unmanned underwater vehicle at a preset height right above the unmanned underwater vehicle by utilizing an active disturbance rejection control (ADRC) algorithm;
   h) the unmanned aerial vehicle-mounted module configured to:
      i. acquire lake surface point cloud data and attitude data of the unmanned aerial vehicle-mounted module; and
      ii. determine coordinate system conversion parameters of the unmanned underwater vehicle and the unmanned aerial vehicle according to the attitude data of the unmanned aerial vehicle-mounted module;
   i) the ground operation module configured to:
      i. determine the lake surface point cloud data under the geographic coordinate system, the under-lake point cloud data under the geographic coordinate system and the under-lake single-beam ranging data under the geographic coordinate system according to the coordinate system conversion parameters
      ii. construct a water three-dimensional topographic map according to the lake surface point cloud data under the geographic coordinate system,
      iii. construct a lake coastal three-dimensional topographic map according to the under-lake point cloud data under the geographic coordinate system;
      iv. construct a lake bottom three-dimensional topographic map according to the under-lake single-beam ranging data under the geographic coordinate system; and
      v. determine the lake water capacity based on the water three-dimensional topographic map, the lake coastal three-dimensional topographic map and the lake bottom three-dimensional topographic map.

2. The system for measuring water capacity of polar lakes according to claim 1, wherein the unmanned underwater vehicle-mounted module comprises:
   a first computer, an underwater single-beam sensor, a linear array laser radar sensor and a first UWB data transmission unit;
   the first computer is respectively connected with the underwater single-beam sensor, the linear array laser radar sensor and the first UWB data transmission unit;

the first computer is used for controlling the underwater single-beam sensor to obtain the under-lake single-beam ranging data;

the first computer is further used for controlling the linear array laser radar sensor to obtain the under-lake point cloud data;

the first UWB data transmission unit is further connected with the ground operation module; and the first computer is further used for controlling the first UWB data transmission unit to transmit the under-lake single-beam ranging data and the under-lake point cloud data.

3. The system for measuring water capacity of polar lakes according to claim 2, wherein
the model of the underwater single-beam sensor is PSA-916; and
the model of the linear array laser radar sensor is a Sagitar 128-line laser radar.

4. The system for measuring water capacity of polar lakes according to claim 2, wherein the unmanned underwater vehicle-mounted module is further provided with a pose cube and an infrared beacon positioning light array.

5. The system for measuring water capacity of polar lakes according to claim 4, wherein the unmanned aerial vehicle-mounted module comprises:
a second computer, a down looking camera, an area array laser radar sensor and a second UWB data transmission unit;
the second computer is respectively connected with the down looking camera, the area array laser radar sensor and the second UWB data transmission unit;
the down looking camera is used for shooting the pose cube and the infrared beacon positioning light array;
the second computer is used for determining attitude data of the unmanned underwater vehicle-mounted module according to an image of the pose cube and an image of the infrared beacon positioning light array, and determining the coordinate system conversion parameters of the unmanned underwater vehicle and the unmanned aerial vehicle according to the attitude data of the unmanned underwater vehicle-mounted module;
the second computer is used for controlling the area array laser radar sensor to obtain the under-lake point cloud data; the second ultra-wideband (UWB) data transmission unit is connected with the ground operation module; and the second computer is used for controlling the second UWB data transmission unit to transmit the lake surface point cloud data and the coordinate system conversion parameters.

6. The system for measuring water capacity of polar lakes according to claim 5, wherein the area array laser radar sensor is a 128-line area array laser radar sensor.

7. The system for measuring water capacity of polar lakes according to claim 5, wherein the unmanned aerial vehicle-mounted module further comprises:
a holder; and
the holder is used for carrying the down looking camera and the area array laser radar sensor.

8. A method for measuring water capacity of polar lakes, wherein the method is applied to the system for measuring water capacity of polar lakes according to claim 1, and the method comprises:
acquiring a planned path of the unmanned underwater vehicle, and controlling the unmanned underwater vehicle to move along with the unmanned underwater vehicle at a preset height right above the unmanned underwater vehicle by utilizing an active disturbance rejection control (ADRC) algorithm;
acquiring under-lake point cloud data and under-lake single-beam ranging data;
acquiring lake surface point cloud data and attitude data of the unmanned aerial vehicle-mounted module;
determining coordinate system conversion parameters of the unmanned underwater vehicle and the unmanned aerial vehicle according to the attitude data of the unmanned aerial vehicle-mounted module;
determining the lake surface point cloud data under the geographic coordinate system, the under-lake point cloud data under the geographic coordinate system and the under-lake single-beam ranging data under the geographic coordinate system according to the coordinate system conversion parameters;
constructing a water three-dimensional topographic map according to the lake surface point cloud data under the geographic coordinate system;
constructing a lake coastal three-dimensional topographic map according to the under-lake point cloud data under the geographic coordinate system;
constructing a lake bottom three-dimensional topographic map according to the under-lake single-beam ranging data under the geographic coordinate system; and
determining the lake water capacity based on the water three-dimensional topographic map, the lake coastal three-dimensional topographic map and the lake bottom three-dimensional topographic map.

9. The method according to claim 8, wherein the unmanned underwater vehicle-mounted module comprises:
a first computer, an underwater single-beam sensor, a linear array laser radar sensor and a first ultra-wideband (UWB) data transmission unit;
the first computer is respectively connected with the underwater single-beam sensor, the linear array laser radar sensor and the first UWB data transmission unit;
the first computer is used for controlling the underwater single-beam sensor to obtain the under-lake single-beam ranging data;
the first computer is further used for controlling the linear array laser radar sensor to obtain the under-lake point cloud data;
the first UWB data transmission unit is further connected with the ground operation module; and the first computer is further used for controlling the first UWB data transmission unit to transmit the under-lake single-beam ranging data and the under-lake point cloud data.

10. The method according to claim 9, wherein
the model of the underwater single-beam sensor is PSA-916; and
the model of the linear array laser radar sensor is a Sagitar 128-line laser radar.

11. The method according to claim 9, wherein the unmanned underwater vehicle-mounted module is further provided with a pose cube and an infrared beacon positioning light array.

12. The method according to claim 11, wherein the unmanned aerial vehicle-mounted module comprises:
a second computer, a down looking camera, an area array laser radar sensor and a second UWB data transmission unit;
the second computer is respectively connected with the down looking camera, the area array laser radar sensor and the second UWB data transmission unit;
the down looking camera is used for shooting the pose cube and the infrared beacon positioning light array;
the second computer is used for determining attitude data of the unmanned underwater vehicle-mounted module according to an image of the pose cube and an image of the infrared beacon positioning light array, and determining the coordinate system conversion parameters of the unmanned underwater vehicle and the unmanned aerial vehicle according to the attitude data of the unmanned underwater vehicle-mounted module;

the second computer is used for controlling the area array laser radar sensor to obtain the under-lake point cloud data;

the second UWB data transmission unit is connected with the ground operation module; and the second computer is used for controlling the second UWB data transmission unit to transmit the lake surface point cloud data and the coordinate system conversion parameters.

13. The method according to claim 12, wherein the area array laser radar sensor is a 128-line area array laser radar sensor.

14. The method according to claim 12, wherein the unmanned aerial vehicle-mounted module further comprises:

a holder; and the holder is used for carrying the down looking camera and the area array laser radar sensor.

\* \* \* \* \*